United States Patent [19]

Rohs et al.

[11] Patent Number: 4,905,807

[45] Date of Patent: Mar. 6, 1990

[54] ROTARY VIBRATION DAMPER

[76] Inventors: Ulrich Rohs, Roostrasse 11, D-5160 Dueren; Dieter Voigt, Parkstrasse 70, D-5100 Aachen, both of Fed. Rep. of Germany

[21] Appl. No.: 229,627

[22] Filed: Aug. 8, 1988

[30] Foreign Application Priority Data

Aug. 13, 1987 [DE] Fed. Rep. of Germany ....... 3726926

[51] Int. Cl.⁴ ............................................. F16D 31/04
[52] U.S. Cl. .................................... 192/61; 192/30 V
[58] Field of Search ............. 192/61, 30 V; 74/752 C, 74/774, 794; 464/24

[56] References Cited

U.S. PATENT DOCUMENTS

| | | | |
|---|---|---|---|
| 881,472 | 3/1908 | Hollister | 192/61 |
| 2,652,911 | 9/1953 | Somers | 192/61 |
| 2,811,233 | 10/1957 | Hindmarch | 192/61 |
| 3,025,724 | 3/1962 | Booke | 74/774 X |
| 3,444,969 | 5/1969 | Berklege | 192/61 |
| 3,780,841 | 12/1973 | Wells | 192/61 |
| 4,322,988 | 4/1982 | Hill | 74/774 |
| 4,344,338 | 8/1982 | Hattori et al. | 74/752 C |
| 4,674,615 | 6/1987 | Synder | 192/61 |

FOREIGN PATENT DOCUMENTS

| | | | |
|---|---|---|---|
| 563353 | 9/1923 | France | 192/61 |
| 55-33924 | 3/1980 | Japan | 74/774 |
| 294015 | 7/1928 | United Kingdom . | |

*Primary Examiner*—Leslie A. Braun
*Assistant Examiner*—Richard M. Lorence
*Attorney, Agent, or Firm*—Collard, Roe & Galgano

[57] ABSTRACT

There is provided a device for use with a rotary vibration damper, particularly in a piston engine, which varies the flow volume rate of a liquid damping medium. Spur gears are supported in a planetary gear type system in the cylindrical casing of the damper, the spur gears being connected to one of the engine drive shaft or the damper output shaft. The spur gears form a gear pump for a closed circuit of the damping medium and mesh with a central spur gear mounted on the other one of the engine drive or the damper output shaft. A reservoir chamber for the damping medium is provided in the conveying conduit on the pressure side having an elastically variable volume. A piston valve is provided in the conveying conduit on the pressure side which is controlled as a function of the engine speed or revolutions wherein the piston, by its axial position, is adapted to vary the cross section of the conveying conduit and thereby serve as a throttle member.

5 Claims, 2 Drawing Sheets

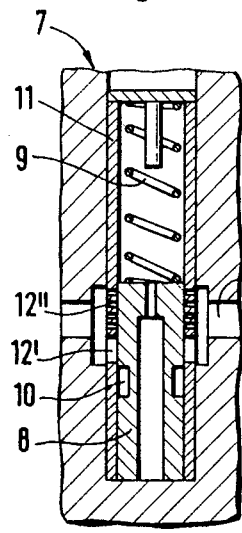
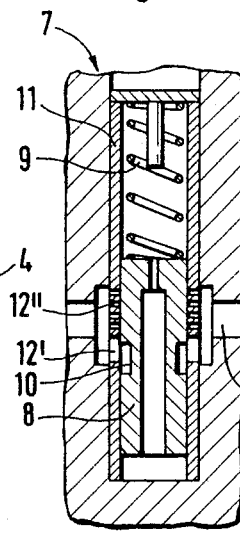
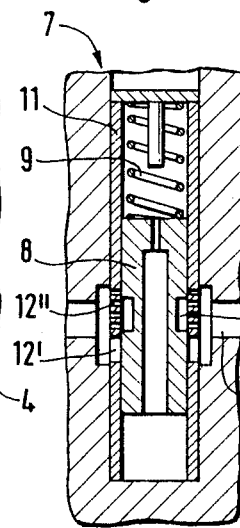
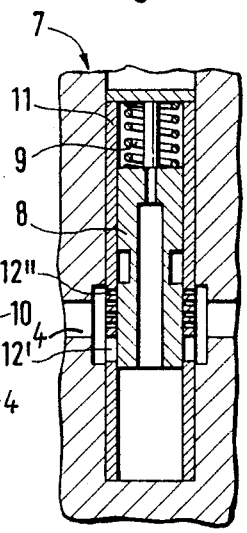
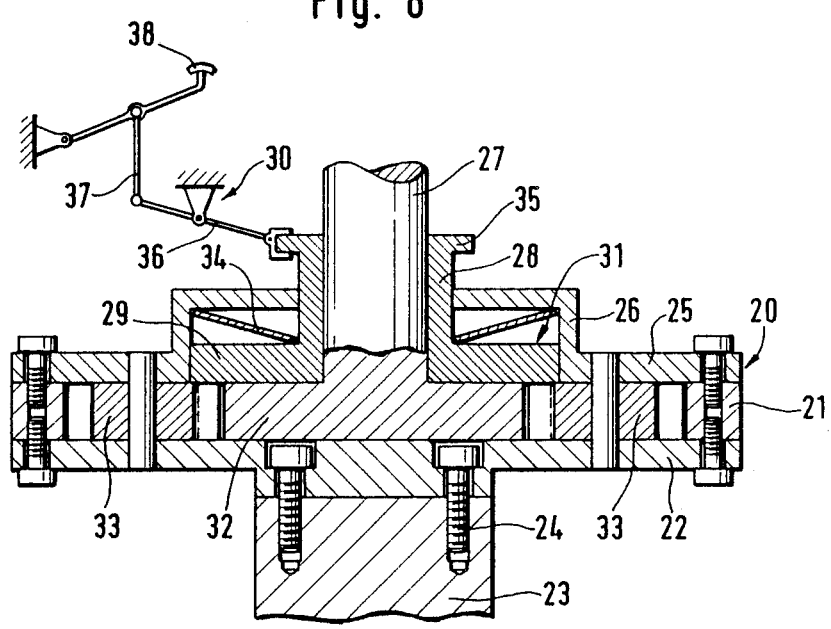

ROTARY VIBRATION DAMPER

The present invention relates to a rotary vibration damper which includes means for varying the flow volume rate of a fluid damping medium, in particular for piston engines. The damper utilizes spur gears supported in a plaanetary gear-type system in the revolving cylindrical casing of the damper, which is connected with one of the engine drive shaft or the damper output shaft, the spur gears forming a gear pump for a closed circuit of the damping medium and mesh with a central spur gear mounted on the other engine drive shaft or damper output shaft. The damper also includes a reservoir chamber installed in the conveying conduit of the closed circuit for the damping medium on the pressure side.

It is well known that rotary vibration is caused in piston engines, i.e., the so-called idle rattle when the engine is at idle, and at about 1500 to 2200 revolutions per minute, very high full-load vibration is caused by the change in the positions in which the gears of the gear system mesh, as well as the so-called high-speed vibration, which is caused at very high R.P.M.s. in excess of 2200. In addition to such rotary vibration, which is dependent upon or a function of engine speed, the so-called "bonanza effect" is known, which are low-frequency rotary vibrations produced when the drive train is engaged by the clutch. Under load, the drive train is, in a way, wound up like a torsion spring, accordingly causing rotational vibration.

A rotational vibration damper is disclosed in British Patent Specification No. 794,015, which, at that time, was developed for ship engines, and has been used only for such engines. In contrast to motor vehicle engines, ship engines operate substantially at a single speed, whereas the other operating conditions are insignificant. This means that the torque to be transmitted can be fixed with relatively high accuracy. The Sandner-damper, described in the above British patent document, is entirely suitable and usable for ship drive trains.

The situation, however, is entirely different with motor vehicle engines, in which the torque is dependent upon engine speed and reaches its maximum value at about half of the maximum engine R.P.M. With such engines, it is important to achieve with rotary vibration dampers effective damping of the vibration throughout the entire characteristic field of the engine even during thrust operations (downhill drives), which is non-existent with ships.

Therefore, the object of the present invention is to provide a rotational vibration damper which is capable of servicing at least all ranges of rotational vibration depending on engine speed, which are:

| | | |
|---|---|---|
| Idle running | low R.P.M. | Md = 0 |
| Starting acceleration | low R.P.M. | Md = high |
| High-speed driving | high R.P.M. | Md = high |
| Thrust operation | high R.P.M. | Md = negative |
| Gear-change operations | high R.P.M. | Md = variable |

This is not possible with the Sandner-damper.

The above object is accomplished in accordance with the present invention by the provision of a rotary vibration damper, particularly in a piston engine, having means to vary the flow volume rate of a liquid damping medium. Spur gears are supported in a planetary gear type system in the cylindrical casing of the damper, the spur gears being connected to one of the engine drive shaft or the damper output shaft. The spur gears form a gear pump for a closed circuit of the damping medium and mesh with a central spur gear mounted on the other engine drive shaft or damper output shaft. A reservoir chamber for the damping medium is provided in the conveying conduit on the pressure side of the closed circuit having an elastically variable volume. A piston valve is provided in the conveying conduit on the pressure side which is controlled as a function of the engine speed or revolutions wherein the piston, by its axial position, is adapted to vary the cross section of the conveying conduit and thereby serve as a throttle member.

While in the rotary vibration damper according to the present invention, the piston valves are controlled as a function of the engine speed, the valves of the Sandner-damper are simply valves expected to safely assure the correct direction of flow of the damping medium. Thus the pistons of these valves are arranged axially and, accordingly, moving only as a function of the pressure of the fluid.

The flow volume rate of the damping medium may be varied either by temporarily withdrawing the damping medium in a reservoir, or by throttling through varying the cross section of the conveying conduit, which throttling acts in addition to the flow friction, or by combining these two measures. In the first-mentioned case, the vibration amplitudes are diminished in the sense of a resilient element while damping takes place at the same time due to the flow friction, which is present in any case and which makes such associated resiliency or spring effect more effective. In the second case, damping takes place by increasing the flow friction, i.e., energy is eliminated by additional throttling.

It is also advantageous if provision is made for both resiliency by means of reservoirs and damping through throttling valves. In this way, particularly favorable damping of the rotational vibration, depending on engine speed, is achieved.

For the purpose of additionally damping the rotational vibration known as the "bonanza effect", which is the low-frequency vibration produced by the drive train particularly when changing gears, it is proposed according to another feature of the invention that a short-circuit connection is provided between each pressure and suction side of the conveying conduit, or between its sections disposed between the two pairs of spur gears, such short-circuit connection being closed off by an excess pressure valve bridging the piston valve. The excess pressure valve opens such short-circuit connection by the sudden increase of the torque occurring when gears are changed, i.e., when the conveying pressure in the conveying conduit rises suddenly in conformity with such torque, and damps the low-frequency rotational vibration.

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

Figure 1:
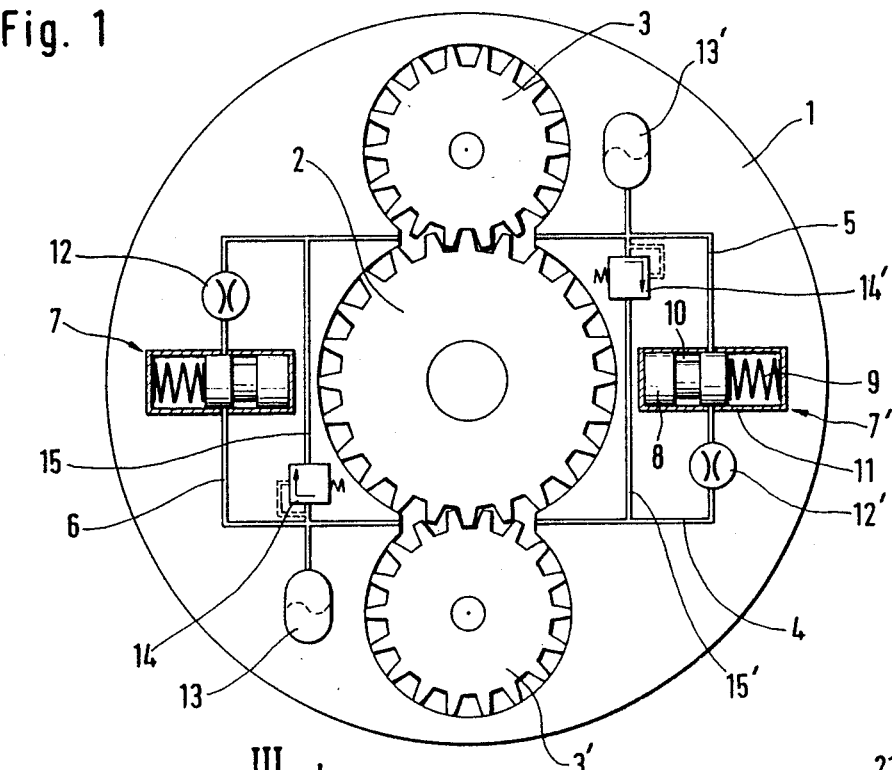
FIG. 1 is a schematic top view of a rotational vibration damper according to the present invention.

FIGS. 4 to 7 are cross-sectional views of the various operating conditions of the piston valve provided in the rotational vibration damper, which operates in dependance on centrifugal force: the operating conditions shown are standstill, idle running, full load, and high-speed running, respectively; and FIG. 8 is a longitudinal cross-sectional view through a preferred embodiment of a rotational vibration damper according to the present invention Now turning to the drawings, there is shown in FIG. 1 a rotational vibration damper consisting of a damper casing 1, a central spur gear 2 arranged therein, and at least two spur gears 3 and 3' combining with spur gear 2 and arranged in the manner of a planetary system. A conveying conduit 4 for a fluid damping medium connects the pair of spur gears 2 and 3 from the pressure to the suction side of the following pair of gears 2 and 3' and forms as a whole a closed pump circuit. Included in the closed circuit are control devices, described hereinafter, connected with conveying conduit 4 which devices are explained hereinafter in greater detail. The spur gears 2, 3 and 2, 3' jointly form the gear pumps.

Conveying conduit 4 consists of identical sections 5 and 6, each of which are disposed between two pairs of spur gears 2 and 3, and 2 and 3'. A radially arranged piston valve 7 serving as the device for varying the flow volume rate of the damping medium by blocking or releasing the flow-through in the conveying conduit is disposed in each section 5 and 6, respectively. Piston 8 of valve 7, which is freely movable in valve housing 11, is movable from a resting, inner closing position (FIG. 4) into an outer closing position (FIG. 7) under the action of centrifugal force against the action of return spring 9.

Piston 8 has a center passage opening 10, for example a constriction, for passage of the damping medium. Within the zone of the connection of the conveying conduit, valve housing 11 has passage openings in its wall, which openings, in FIG. 1, are schematically shown as the throttles 12 next to the piston valve. When piston 8, acting as the throttle setting member, moves axially, such passages are more or less cleared for the passage of the damping medium, and they have a cross sectional shape adapted to the damping characteristics of the engine to be damped. Passage openings 12 may be a number of perforations with different diameters, if need be, or a longitudinal slot with non-parallel sides, if necessary.

FIGS. 4 to 7 show piston valve 7 in four different operating conditions. FIG. 4 shows the valve with the engine not operating or at standstill. In this condition, the flow-through of the damping medium in the conveying conduit is blocked by the radially outer part (in the drawing the top part) of piston 8. In the idling position shown in FIG. 5, piston 8 is displaced radially outward to an extent such that its constriction 10 releases a relatively large passage opening 12', i.e., conveying conduit 4 is throttled slightly. If the R.P.M. is increased further, e.g. into the 1500 to 2200 R.P.M. range, the radially inner part of piston 8 already blocks the passage openings 12' and the constriction 10 only releases a smaller cross section of the conveying conduit 4 through passage openings 12'', such cross section conforming to the damping characteristics (FIG. 6). Upon reaching an R.P.M. in excess of 2200, i.e., in the high-speed range, conveying conduit 4 is completely shut off by the inner part of piston 8 as shown in FIG. 7.

When the R.P.M. is reduced, piston 8, because of the lower centrifugal force and the additional action of return spring 9, again moves radially inward until it reaches its inner closing position at standstill.

As the pressure load in conveying conduit 4 varies periodically as well due to the rotational vibrations, provision is made in each section 5 and 6 of conveying conduit 4 for another device for varying the flow volume per unit of time or its rate, such additional device being a reservoir chamber 13. Reservoir 13 is arranged on the pressure side, i.e., in the direction of flow before throttle 12 and, by way of example, consists of a bubble or membrane reservoir, which, when the pressure rises, temporarily receives part of the damping medium from conveying conduit 4, and discharges such amount of damping medium again once the pressure peak has subsided. The reservoir acts similar to a wind drum and, in a damping system, in the manner of a spring reducing the vibration amplitudes. Combined with the flow friction in conveying conduit 4, such a reservoir chamber 13 would suffice in certain cases, so that piston valve 7 could be omitted, if need be. In the preferred embodiment, however, both elements are provided, jointly forming a useful combination for achieving a maximum amount of vibration damping.

In order to avoid the aforementioned "bonanza effect", i.e., the occurrence of low-frequency rotational vibration caused when the drive train is engaged by the clutch, such vibration not being dependent on engine speed, provision is made for a short-circuit connection 15, which is secured by an overpressure valve 14 and which bridges piston valve 7 between the pressure and the suction sides of sections 5 and 6, respectively. When the drive train is engaged by the clutch, the torque or the pressure applied to conveying conduit 4 via the spur gears 2 and 3 rises almost in the form of a surge load, by which overpressure valve 14 is opened briefly, feeding a substantial part of the damping medium around piston valve 7 to the next-following pair of spur gears 2 and 3.

Figure 2:
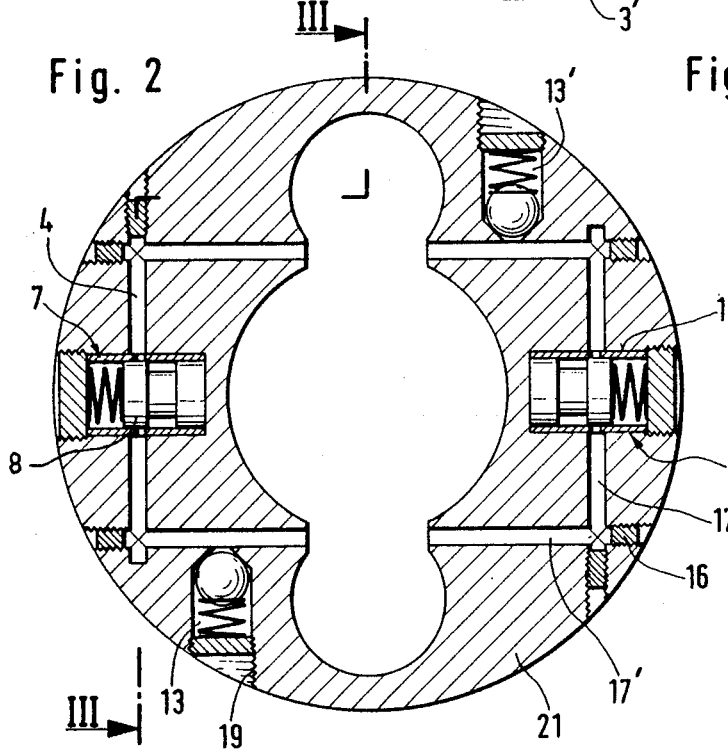
FIG. 2 is a cross-sectional view through the casing of the rotational vibration damper according to the invention.
Figure 3:
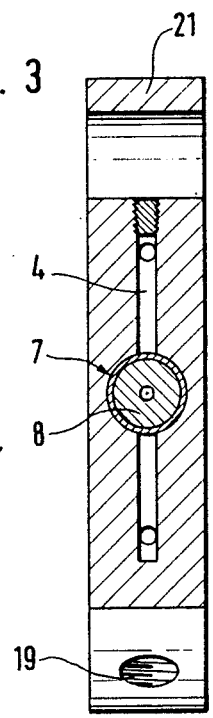
FIG. 3 is a cross-sectional view taken along line III—III of FIG. 2.

In FIGS. 2 and 3 there is shown a practical embodiment of a rotational vibration damper incorporating the means of the present invention for varying the flow volume rate of the damping medium.

The drawing shows the center part 21 of the damper casing 1 consisting of a circular plate with a thickness conforming with the axial expanse of gears 2 and 3 and 2 and 3', which are not shown. This center part 21 is closed by a bottom (not shown in the drawing) and a cover (also not shown in the drawing), in which bottom and cover the spur gears 3 are supported in an arrangement of the type of a planetary system. Damper casing 1 is rigidly connected either with the engine drive shaft or with the damper output shaft, and revolves with such engine. The central spur gear 2 is accordingly connected with the remaining engine drive shaft or damper output shaft.

Conveying conduit 4 may be formed, for example by bores 17 in center part 21, such bores being sealed by means of screws 16. For arranging piston valves 7, provision is made for cross bores 18 having a larger diameter, such cross bores crossing the bores 17 and receiving piston valves 7, which are radially inserted in the cross bores from the outside. In a similar way, provision is made for cross bores 19 for receiving reservoirs 13, which are shown here schematically as spring-loaded spherical valves.

In FIG. 8 there is shown another practical embodiment of a rotational vibration damper incorporating the means of the present invention for varying the flow volume rate of the damping medium, with an overpressure valve which is open by the excess pressure produced when gears are changed, and by additional actuation of coupling leverage 30. In this embodiment, furthermore, the rotational vibration damper is integrated in the clutch in a way such that a practically non-wearing coupling is formed.

In FIG. 8, a coupling housing 20 consisting of a center part 21 conforming to the afore-specified damper casing 1 of FIGS. 2 and 3, a bottom 22, which is rigidly connected with drive shaft 23 by means of screws 24, and with a cover 25, which is joined with the center part 21 by screws. Cover 25 has an annular shape and a center cylindrical attachment 26, whose diameter is larger than the outer diameter of central spur gear 32. A bushing 28 is guided in attachment 26 and is mounted on output shaft 27 supporting central spur gear 32 of the rotational vibration damper. Bushing 28 has a piston plate 29 disposed on its end facing spur gears 32 and 33 and covering the inside width of attachment 26. When plate 29 is in the advanced, closed position, i.e., displaced forwardly (as shown in the figure), it forms the continuation of the remaining wall of cover 25, which wall rests against spur gears 32 and 33. The diameter of piston plate 29 corresponds with the inside width of the attachment 26. Normally, it is maintained in the closed position by a pressure spring 34 and forms the actuating or setting member of an over-pressure valve 31 connecting all pressure and suction sides of the gear pump.

The bushing 28 is suitably connected with an actuating device 30 for the clutch. This is shown schematically in FIG. 8, as follows: At its free end, bushing 28 has a collar 35, which is engaged by a lever 36 of a clutch or coupling leverage 37, the latter being actuated by a pedal 38.

In the position shown, the clutch is engaged and practically operates as a non-wearing hydraulic coupling. When pedal 38 is actuated, which normally would cause the "bonanza effect", bushing 28 is axially lifted from spur gears 32 and 33 via coupling leverage 37 and against pressure spring 34, which also lifts the piston plate 29, so that a short-circuit connection is established across the entire gear pump. The bridging of piston valves 7 resulting from such short-circuit connection is cancelled as soon as the piston plate 29 has been returned to its starting position due to the relief of coupling leverage 37 and the action of pressure spring 34.

Instead of using piston valves 7 actuated by centrifugal force, it is also possible to provide for piston valves in the form of magnetic valves, such valves being controllable by an on-board computer or the like of the vehicle.

While only a single embodiment of the present invention has been shown, it will be obvious that many changes and modifications may be made thereunto, without departing from the spirit and scope of the invention.

What is claimed is:

1. In a rotary vibration damper, particularly in a piston engine having a drive shaft, for varying the flow volume rate of a liquid damping medium, the rotary vibration damper being connected to the engine drive shaft and having an output shaft, a cylindrical casing connected to one of the engine drive shaft or the output shaft, spur gears supported in a planetary gear-type system in the cylindrical casing, a central spur gear mounted on the other one of the drive or output shafts and meshing with the spur gears of the planetary gear type system to form a gear pump for a closed circuit of the damping medium, and a conveying conduit for the damping medium forming the closed circuit and connecting the pressure and suction sides of the gear pump, the improvement comprising:

a reservoir chamber for the damping medium in the pressure side of the conveying conduit, the reservoir chamber having an elastically variable volume;

a piston valve on the pressure side of the conveying conduit, said piston valve having a piston whose axial position is controlled as a function of the engine speed, said piston being adapted by its axial position to vary the cross section of said conveying conduit and serve as a throttle member; and a short circuit connection, between the pressure and suction sides of the conveying conduit, which is closed off by an excess pressure valve and which bridges the piston valve.

2. The device as defined in claim 1, wherein within the range of each piston valve, the cross section of the conveying conduit has a size across the path of piston travel conforming in each case with the damping characteristics.

3. The device as defined in claim 1, wherein the piston valve is radially fastened on the revolving damper casing, of which the piston, the latter being freely movable as a centrifugal weight in a valve casing, rests against a return spring and has a center passage opening for the damping medium, and the valve casing has passage openings within a zone of connection with the conveying conduit, wherein the moved piston, in dependence of the centrifugal force, is capable to more or less close said passage openings.

4. The device as defined in claim 3, wherein the passage openings in the valve casing are slot-like openings.

5. The damper as defined in claim 1, wherein the damper casing, being mounted to the engine drive forms a clutch housing for further driven devices connected to the output shaft of the damper, said damper casing having a cup-like cylindrical attachment, the diameter of which is larger than the outer diameter of the central spur gear and wherein within said attachment a piston plate is arranged covering more than the outer diameter of the central spur gear, from which it is liftable against a resetting spring which is arranged between said piston plate and a bottom of said attachment, said piston plate, when resting against the gear pump on the side of said attachment forms a part of the casing, rotating jointly with the latter, and said piston plate forming the setting member of a clutch and an excess pressure valve connecting all pressure and suction sides.

* * * * *